(12) United States Patent
Yan et al.

(10) Patent No.: US 8,379,778 B2
(45) Date of Patent: Feb. 19, 2013

(54) BURSTY INTERFERENCE SUPPRESSION FOR COMMUNICATIONS RECEIVERS

(75) Inventors: Ming Yan, San Diego, CA (US); Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 878 days.

(21) Appl. No.: 11/875,588

(22) Filed: Oct. 19, 2007

(65) Prior Publication Data

US 2009/0003427 A1 Jan. 1, 2009

Related U.S. Application Data

(60) Provisional application No. 60/946,939, filed on Jun. 28, 2007.

(51) Int. Cl.
*H03D 1/04* (2006.01)
(52) U.S. Cl. ........ 375/346; 375/130; 375/232; 375/260; 375/262; 375/267; 375/340; 375/343; 375/347
(58) Field of Classification Search .................. 375/130, 375/232, 260, 267, 346; 370/203–210
See application file for complete search history.

(56) References Cited

U.S. PATENT DOCUMENTS

| | | | | |
|---|---|---|---|---|
| 5,852,630 | A * | 12/1998 | Langberg et al. | 375/219 |
| 6,986,096 | B2 * | 1/2006 | Chaudhuri et al. | 714/780 |
| 7,391,830 | B2 * | 6/2008 | Kuzminskiy et al. | 375/347 |
| 7,711,330 | B2 * | 5/2010 | Yang et al. | 455/101 |
| 2004/0166887 | A1 | 8/2004 | Laroia et al. | |
| 2005/0069060 | A1 | 3/2005 | Saito | |
| 2006/0007994 | A1 * | 1/2006 | Lai et al. | 375/227 |
| 2006/0062322 | A1 * | 3/2006 | Namgoong et al. | 375/285 |
| 2006/0114981 | A1 * | 6/2006 | Ghosh et al. | 375/232 |
| 2007/0060145 | A1 * | 3/2007 | Song et al. | 455/445 |
| 2008/0310564 | A1 * | 12/2008 | Andrews et al. | 375/348 |

FOREIGN PATENT DOCUMENTS

| | | |
|---|---|---|
| EP | 1176750 A1 | 1/2002 |
| JP | 2003520499 T | 7/2003 |
| JP | 2004088189 A | 3/2004 |
| WO | WO0152489 A1 | 7/2001 |
| WO | WO2004015946 A1 | 2/2004 |
| WO | WO2006034020 | 3/2006 |

OTHER PUBLICATIONS

Ghosh Monisha et al., "Bluetooth Interference Cancellation for 802. 11g WLAN Receivers" 2003 International Conference on Communications (ICC 2003), Anchorage, AK, United States, vol. 2, May 11-15, 2003, pp. 1169-1173, XP002264769 New York, NY, USA p. 1169, left-hand column, line 15—p. 1172, right-hand column, line 3.
International Search Report and Written Opinion—PCT/US2008/067930, International Search Authority—European Patent Office—Mar. 23, 2009.
Van De Beek J-J et al: "On Channel Estimation in OFDM Systems" Proceedings of the Vehicular Technology Conference. Chicago.

(Continued)

*Primary Examiner* — Dhaval Patel
(74) *Attorney, Agent, or Firm* — Kevin T. Cheatham (57) ABSTRACT

Techniques are provided for suppressing interference by taking into account the possible bursty nature of co-channel interference in a communication system. In an aspect, interference levels are separately computed for first and second data portions of a desired signal. The computed interference levels may be used to scale the corresponding data portions for subsequent processing.

31 Claims, 9 Drawing Sheets

OTHER PUBLICATIONS

July 25-28, 1995, New York, IEEE, US, vol. 2 Conf. 45, Jul. 25, 1995, pp. 815-819, XP000551647 ISBN: 0-7803-2743-8 p. 816, left-hand column, line 20—p."" 817, left-hand column, line 23 p. 818, right-hand column, line 3—line 20 figure 5.

Ohta A., et al., "A Study on the Optimum Modulation Mode Selection on Rate-Adaptation Control for Wireless LAN with OFDM/SDM," Technical Report of The Institute of Electronics, Information and Communication Engineers, Jan. 8, 2004, vol. 103, No. 546, pp. 139-144, RC52003-267.

Yoshida S., "Channel Equalizing Techniques for Mobile Communication," Proceeding of 1996 Basis and Boundary Society Conference of The Institute of Electronics, Information and Communication Engineers, Aug. 30, 1996, pp. 366-367, PA-3-8.

* cited by examiner

BURSTY INTERFERENCE SUPPRESSION FOR COMMUNICATIONS RECEIVERS

PRIORITY

This application claims benefit of U.S. Provisional Application No. 60/946,939 titled "SEMI-BURST SCALING TO REJECT ASYNCHRONOUS CO-CHANNEL INTERFERENCE FOR GSM RECEIVER," filed Jun. 28, 2007, the entire disclosure being considered part of the disclosure of this application.

TECHNICAL FIELD

The disclosure relates to communications receivers and, more particularly, to techniques for suppressing bursty interference in communications receivers.

BACKGROUND

In a communication system, a transmitter processes data to generate a modulated signal and transmits the modulated signal via a communication channel to a receiver. The transmitted signal may be distorted by the communication channel, corrupted by noise, and further degraded by co-channel interference, which may be interference from other sources on the same channel and/or frequency band. The receiver receives the signal, and attempts to recover the data sent by the transmitter. The distortion due to the communication channel, the noise, and the co-channel interference all hinder the receiver's ability to recover the transmitted data. Typical receivers employ various processing techniques to combat the effects of such hindrances.

In some communication systems, interference sources may be bursty in nature. It would be advantageous for a receiver to deal effectively with co-channel interference that is bursty in nature.

SUMMARY

One aspect of the present disclosure provides a method for processing a frame in a communications system, the frame comprising a first data portion and a second data portion, the method comprising: receiving the first and second data portions; estimating a first interference level associated with the first data portion; estimating a second interference level associated with the second data portion; scaling a first signal derived from the first data portion with the first interference level; and scaling a second signal derived from the second data portion with the second interference level.

Another aspect of the present disclosure provides an apparatus for processing a frame in a communications system, the frame comprising a first data portion and a second data portion, the apparatus comprising a receiver for receiving the first and second data portions; an interference estimator for estimating a first interference level associated with the first data portion, and for estimating a second interference level associated with the second data portion; and a divider for dividing a first signal derived from the first data portion with the first interference level, and for dividing a second signal derived from the second data portion with the second interference level.

Another aspect of the present disclosure provides an apparatus for processing a frame in a communications system, the frame comprising a first data portion and a second data portion, the apparatus comprising means for receiving the first and second data portions; means for estimating a first interference level associated with the first data portion; means for estimating a second interference level associated with the second data portion; means for scaling a first signal derived from the first data portion with the first interference level; and means for scaling a second signal derived from the second data portion with the second interference level.

Another aspect of the present disclosure provides a computer program product for processing a frame in a communications system, the frame comprising a first data portion and a second data portion, the product comprising computer-readable medium comprising code for causing a computer to estimate a first interference level associated with the first data portion; code for causing a computer to estimate a second interference level associated with the second data portion; code for scaling a first signal derived from the first data portion with the first interference level; and code for scaling a second signal derived from the second data portion with the second interference level.

The details of one or more examples are set forth in the accompanying drawings and the description below. Other features, objects, and advantages will be apparent from the description and drawings, and from the claims.

DETAILED DESCRIPTION

Figure 1:
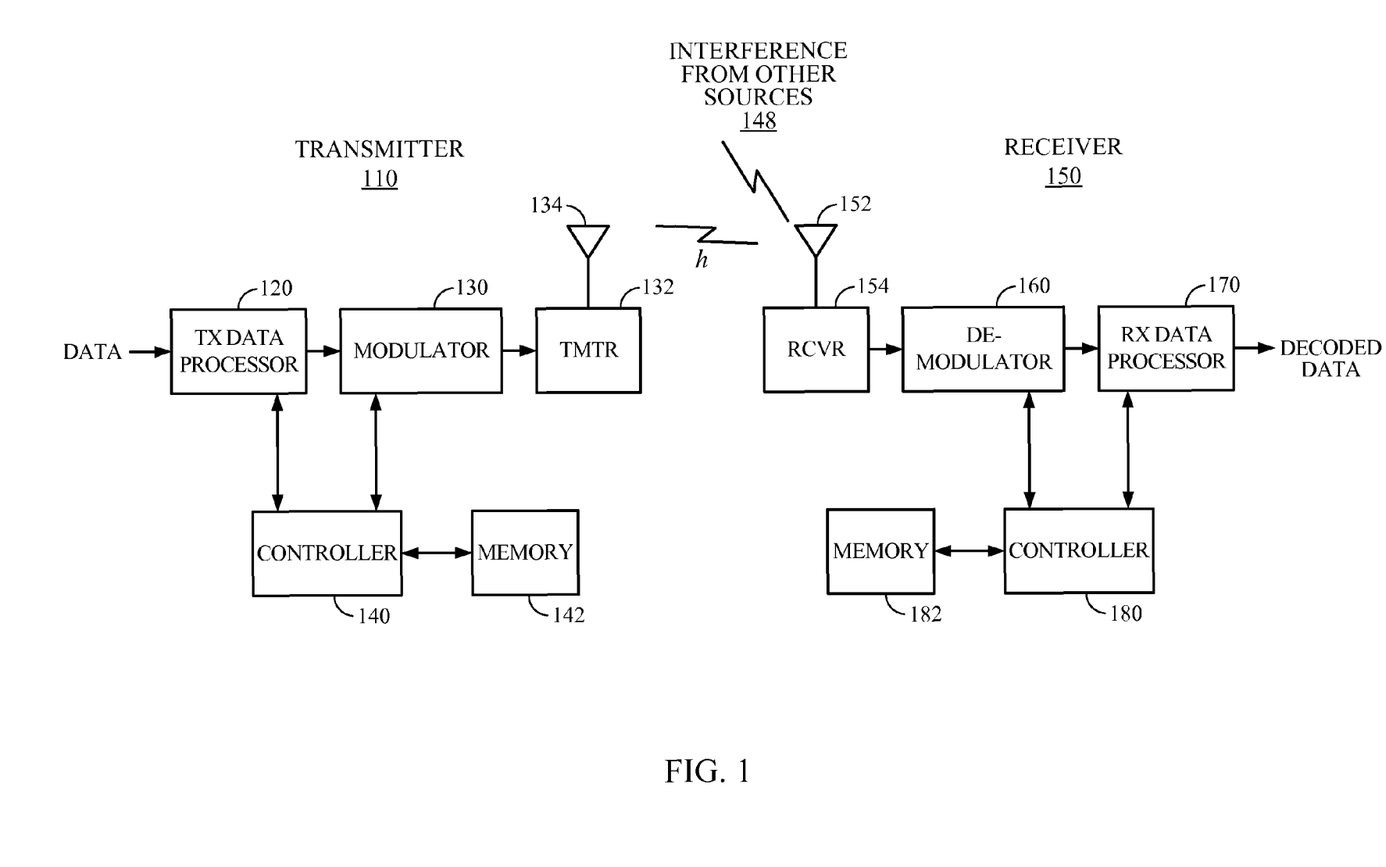
FIG. 1 shows a block diagram of a transmitter 110 and a receiver 150 in a wireless communication system.

FIG. 1 shows a block diagram of a transmitter 110 and a receiver 150 in a wireless communication system. Transmitter 110 may be a base station or a wireless device, and receiver 150 may also be a wireless device or a base station. At transmitter 110, a transmit (TX) data processor 120 may receive, format, encode, and interleave data based on a coding and interleaving scheme, and may provide a stream of input bits to a modulator 130. For example, in an embodiment for Global System for Mobile Communications (GSM), a wireless communications standard, modulator 130 performs Gaussian Minimum Shift Keying (GMSK) modulation on the input bits and provides a GMSK modulated signal. A transmitter unit (TMTR) 132 conditions (e.g., filters and amplifies) the modulated signal and generates a radio frequency (RF) modulated signal, which is transmitted via an antenna 134 to receiver 150 over a channel having a channel response h.

At receiver 150, an antenna 152 receives the RF modulated signal from transmitter 110, and also interference, including co-channel interference from other sources 148. In this disclosure, unless otherwise noted, the term "interference" will be understood to include both noise and co-channel interference. Sources of co-channel interference may include other transmitters operating in the same communications system, transmitters operating in different communications systems, or even non-communications sources of electromagnetic interference such as home appliances. Antenna 152 provides the received signal to a receiver unit (RCVR) 154. Receiver unit 154 conditions and digitizes the received GMSK signal and provides received samples. A demodulator 160 processes the received samples and provides detected bits. An RX data processor 170 processes (e.g., deinterleaves and decodes) the detected bits and recovers the data sent by transmitter 110. The processing by demodulator 160 and RX data processor 170 is complementary to the processing by modulator 130 and TX data processor 120, respectively, at transmitter 110.

Controllers 140 and 180 direct operation at transmitter 110 and receiver 150, respectively. Memory units 142 and 182 provide storage for program codes and data used by controllers 140 and 180, respectively.

Figure 2:
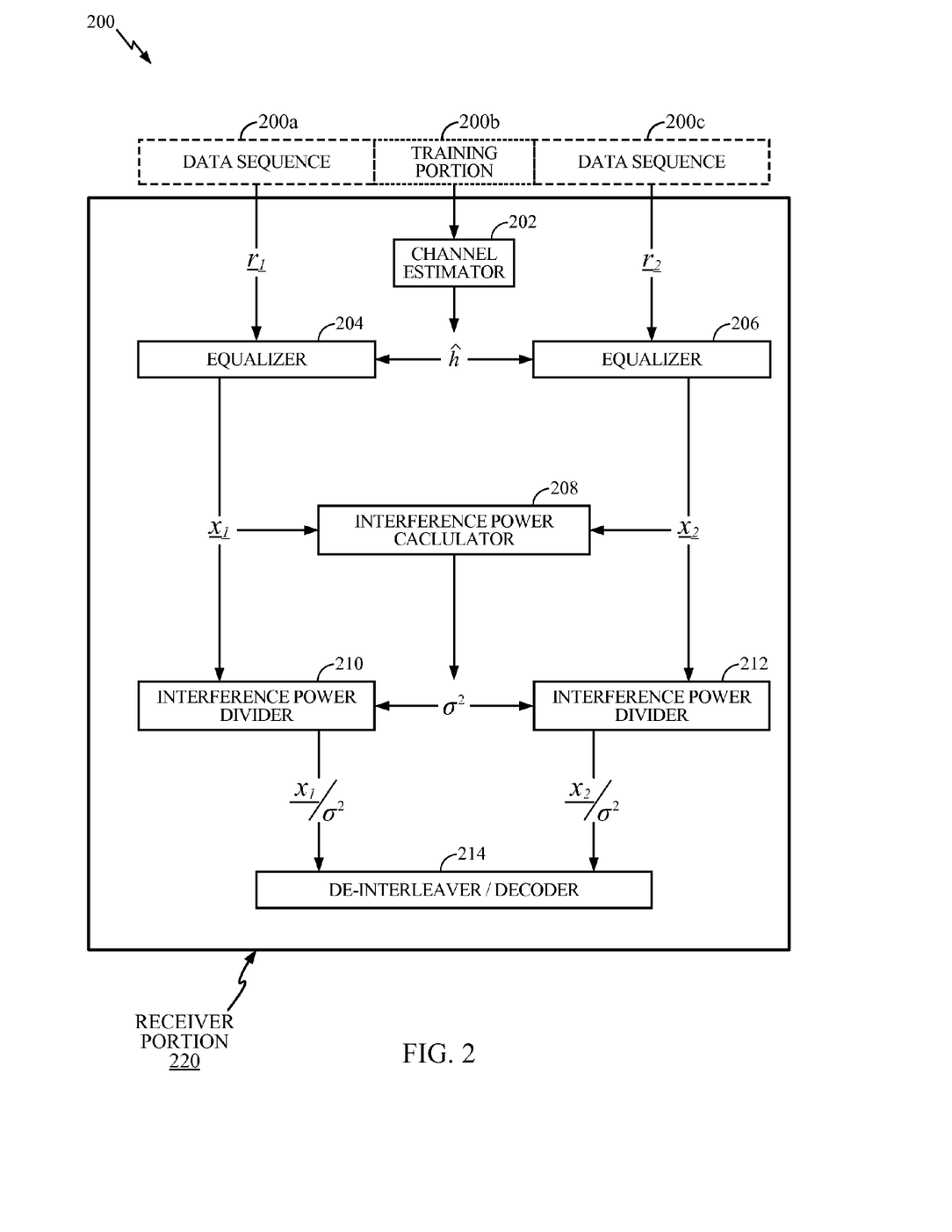
FIG. 2 shows a block diagram of a conventional receiver 220 for processing a received information signal 200.

FIG. 2 shows a portion 220 of a conventional receiver 150 for processing a received information signal 200. In the embodiment shown, information signal 200 includes data sequence 200a, followed by a training portion 200b, followed by data sequence 200c. Data sequences 200a, 200c may contain information such as voice, image, video, control, or any other type of data to be communicated. The information may be coded, interleaved, or processed by any other technique prior to encapsulation as data sequences 200a, 200c. In the embodiment depicted in FIG. 2, the information is coded and interleaved. The signal representations of received data 200a, 200c are $r_1$, $r_2$, respectively. The training portion 200b may comprise a predetermined series of symbols known to the receiver, to aid the receiver in channel estimation. Channel estimator 202 may produce a channel estimate $\hat{h}$ based on the training portion 200b or any other portion of the received signal 200.

To compensate for the channel response h noted in FIG. 1, the signals $r_1$, $r_2$ may be processed by equalizers 204, 206 to generate the equalized signals $x_1$, $x_2$. The equalizers 204, 206 may use the channel estimate $\hat{h}$ derived from the channel estimator 202. Possible equalization techniques include, for example, zero forcing, minimum mean square error (MMSE), decision feedback, soft-output Viterbi algorithm (SOVA), or a combination of maximum likelihood sequence estimation (MLSE) with the Ono algorithm. Note equalization techniques are well-known in the art and are not described further herein. Note also that separate logical instances of equalizers 204, 206 are depicted for illustration only, and in an embodiment, equalization for both portions of data can be performed by a single instance of an equalizer within a receiver.

Regardless of the particular equalization technique employed, equalizers 204, 206 may produce soft equalized signals $x_1$, $x_2$. Interference power dividers 210, 212 divide the equalized signals $x_1$, $x_2$ by an average interference power $\sigma^2$ calculated by the interference power calculator 208. In an embodiment, the interference power calculator 208 may estimate the interference by comparing the equalized signals $x_1$, $x_2$ to the received signals $r_1$, $r_2$, respectively, and assuming that the difference between the equalized and received signals is indicative of the level of interference in the received signal. The dividers 210, 212 effectively scale the equalized signals $x_1$, $x_2$ based on the amount of interference present in the signal, so that signals received with more interference power are weighted less. The weighted signals $x_1/\sigma^2$ and $x_2/\sigma^2$ are input to the de-interleaver/decoder block 214 to recover the original information transmitted.

Note logical instances of processing blocks are depicted for illustration only. Particular embodiments may partition the functionality of the blocks differently than depicted in FIG. 2. For example, in an alternative embodiment, interference power calculator 208 may be integrated with the equalizers 204, 206.

In the conventional receiver shown in FIG. 2, the interference power calculator 208 calculates a single estimate of the interference power $\sigma^2$ for the entire signal 200, which is used to scale both the signal for the data sequence 200a before the training portion 200b, and the signal for the data sequence 200c after the training portion 200b. However, as FIGS. 3A and 3B show, a single estimate of the interference power $\sigma^2$ for the entire signal may be biased in certain scenarios.

Figure 3A:
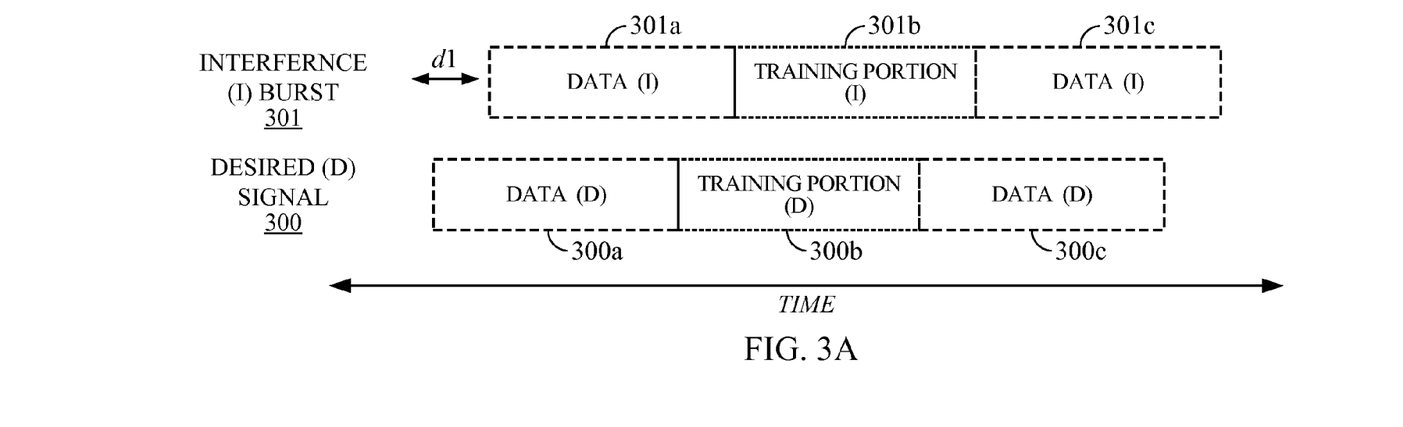
FIG. 3A depicts a scenario wherein a signal is sent from transmitter 110 to receiver 150 as a desired (D) signal 300.

FIG. 3A depicts a scenario wherein a signal is sent from transmitter 110 to receiver 150 as a desired (D) signal 300. In the embodiment shown, the desired signal 300 is formatted as a data sequence 300a, followed by a training portion 300b, followed by another data sequence 300c. The desired signal 300 is received in the presence of an interference (I) burst 301 arriving at receiver 150 at a slight time delay d1 relative to the desired signal 300. Interference burst 301 may be a signal destined for another receiver and is received by receiver 150 as co-channel interference.

In FIG. 3A, because the time offset d1 is short relative to the durations of the desired signal 300 and the interference burst 301, co-channel interference from interference burst 301 is present over a substantial portion of the desired signal 300's duration.

Figure 3B:
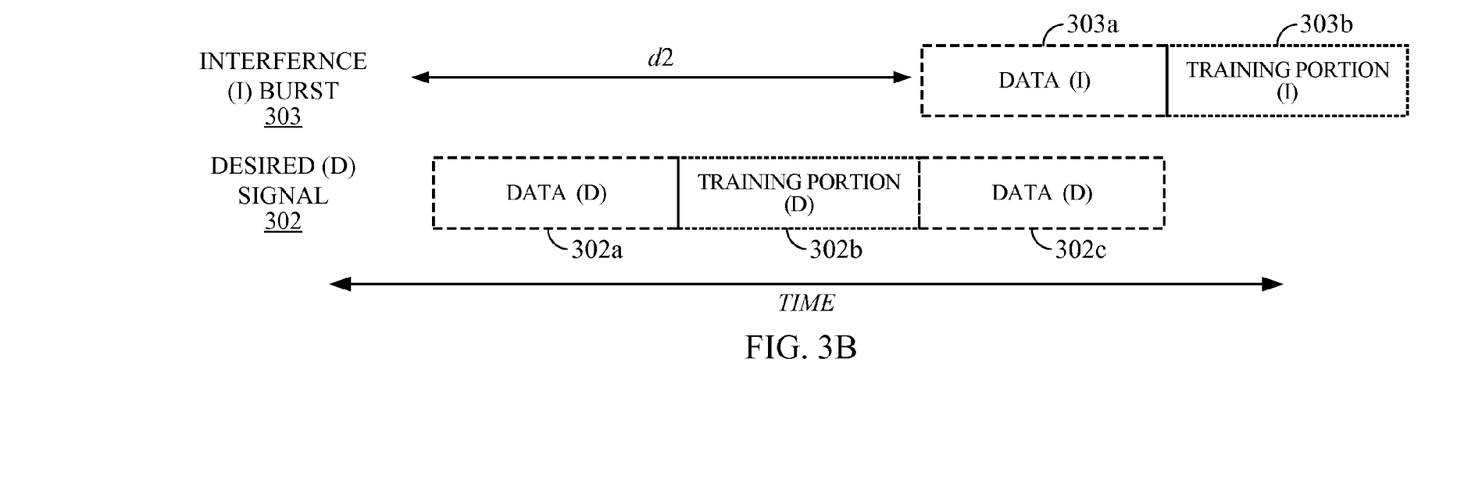
FIG. 3B depicts a scenario wherein an interference (I) burst 303 arrives at receiver 150 with a substantial time delay d2 relative to the desired (D) signal 302.

FIG. 3B depicts a scenario wherein an interference (I) burst 303 arrives at receiver 150 with a substantial time delay d2 relative to the desired (D) signal 302. In contrast with the time delay d1 in FIG. 3A, the time delay d2 in FIG. 3B is significant relative to the durations of the desired signal 302 and the interference burst 303. Therefore, co-channel interference is present only during the reception of the later portion of the desired signal 302, i.e., the portion corresponding to data sequence 302c. This results in the co-channel interference being "bursty" in nature, i.e., the co-channel interference is present only over a limited portion of the entire desired signal. In the scenario depicted in FIG. 3B, the co-channel interference is bursty in time. In other scenarios, co-channel interference may be bursty in other dimensions, such as frequency, space, or code.

In the scenario of FIG. 3B, it is seen that if a single estimate of $\sigma^2$ is determined based on the average level of interference measured over the entire desired signal 302, then such an estimate may be biased for specific portions of the desired signal 302. For example, for the data portion 302a, the estimate $\sigma^2$ may generally be too high, as data portion 302a is received without co-channel interference from interference burst 303. Similarly, for the data portion 302c, the estimate $\sigma^2$ may be too low, as data portion 302c is received with all of the co-channel interference from interference burst 303.

Note that FIGS. 3A and 3B depict scenarios wherein a co-channel interference source is another transmitter transmitting signals according to the same format as the desired signal. In general, however, bursty co-channel interference need not originate from other transmitters operating according to the same communications standard. The techniques of the present disclosure will be equally effective against other types of co-channel interference, including, for example, transmitters operating according to other communications formats, or other sources of electromagnetic radiation such as home appliances or consumer devices.

In an embodiment, a unit of a desired signal is denoted as a "frame." In this specification and in the claims, unless otherwise noted, a frame is defined as a group of symbols destined for a receiver, the symbols being contiguous along at least one dimension. The at least one dimension is typically time, but may also be one or more other dimensions such as time, frequency, space and/or code. The symbols in a frame may be contiguous in more than one dimension, such as both time and frequency. A dimension is specified by the communications protocol or standard as being one along which modulated symbols are separated from each other.

For example, in a system wherein contiguous symbols are separated in time, such as in GSM, a frame can be defined as a time slot (or "GSM burst" in GSM). Alternatively, in a protocol employing orthogonal frequency division multiplexing, contiguous symbols may be separated in frequency, and thus a "short" frame can be a group of symbols contiguous in the frequency domain.

Figure 3C:
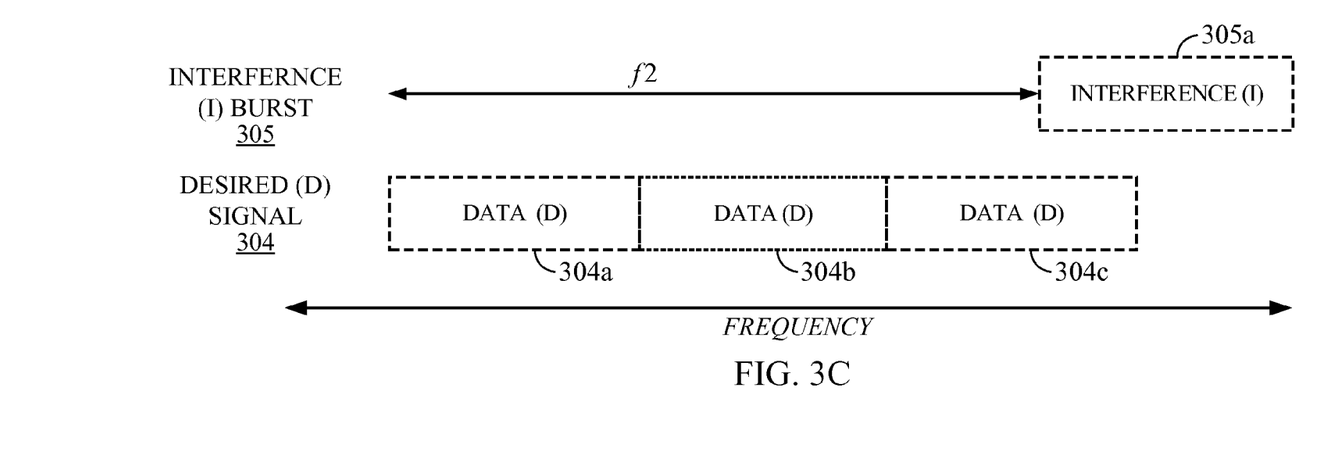
FIG. 3C depicts a scenario in an Orthogonal Frequency Division Multiplex (OFDM) system wherein an interference (I) burst 305 arrives at receiver 150 at a frequency offset f2 relative to the desired (D) signal 304.

FIG. 3C depicts a scenario in an Orthogonal Frequency Division Multiplex (OFDM) system wherein an interference (I) burst 305 arrives at receiver 150 at a frequency offset f2 relative to the desired (D) signal 304. FIG. 3C depicts the frequency analog of the time burst interference scenario depicted in FIG. 3B. For example, the desired signal may be received according to the IEEE 802.11g standard, and the interferer may be a transmission according to the Bluetooth protocol. The second data portion 304c may then comprise subcarriers corrupted by narrowband interference such as an in-band Bluetooth signal, while the first data portion 304a may comprise subcarriers not impacted by that narrowband interference. The techniques described hereinbelow may also be used in this scenario to improve performance.

Note that while FIG. 3C does not explicitly show the presence of a training symbols in the desired signal 304, training symbols may nevertheless be present in the desired signal 304 and used by a receiver for equalization as described herein. Note the placement of the training symbols within a desired signal may be arbitrarily specified by a specific standard or protocol, and the techniques disclosed herein are not limited to any particular placement of the training symbols within a desired signal.

Figure 3D:
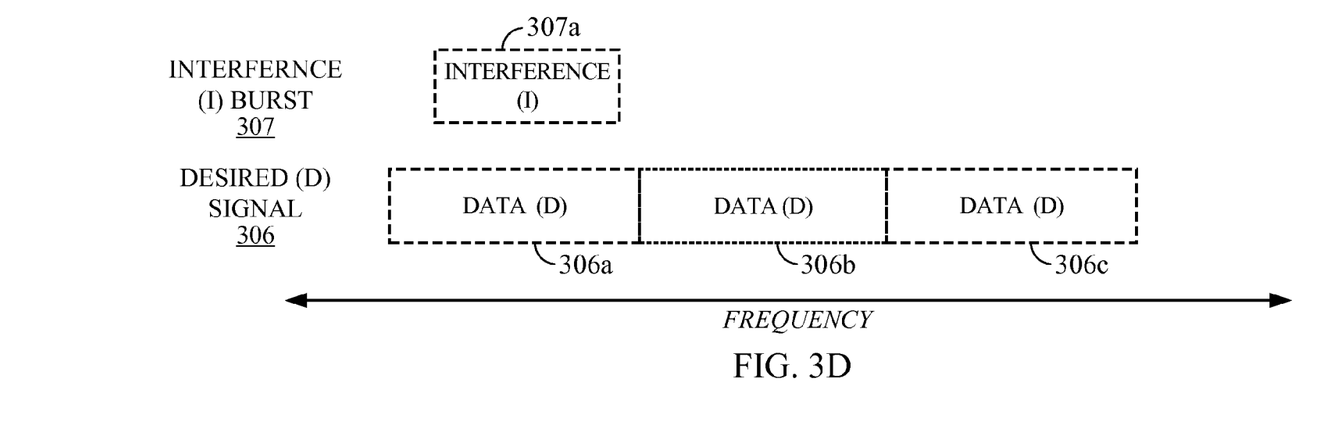
FIG. 3D depicts a scenario wherein an interference (I) burst 307 is restricted to only the first data portion 306a of desired signal 306.

FIG. 3D depicts a scenario wherein an interference (I) burst 307 is restricted to only the first data portion 306a of desired signal 306. The techniques described herein may also be used in this scenario to improve performance.

Figure 3E:
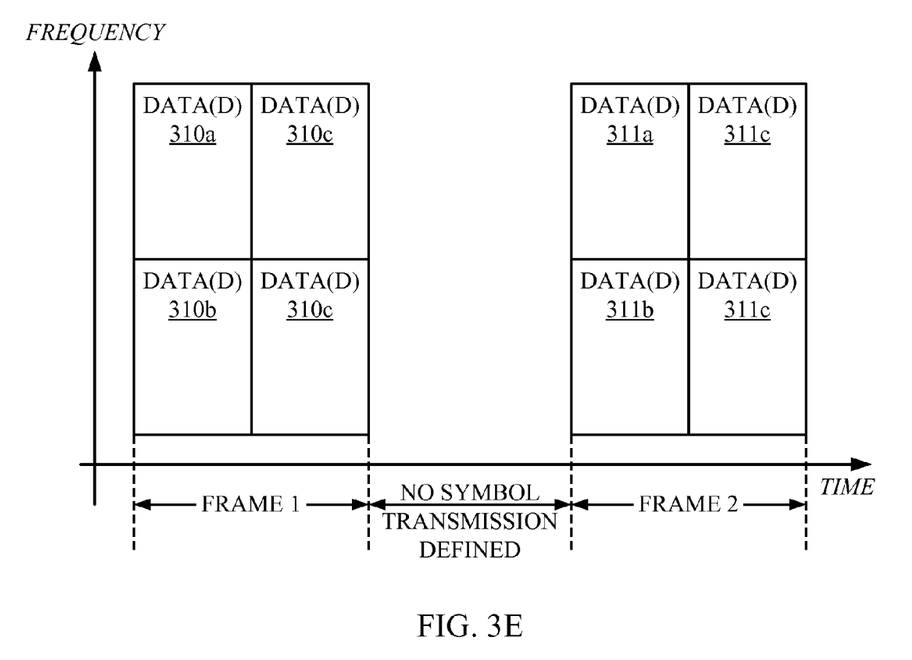
FIG. 3E depicts an embodiment wherein symbols in a frame are contiguous in time and frequency.

In yet another system, in which contiguous symbols are separated in both time and frequency, such as in the OFDMA mode of IEEE 802.16e-2005, a frame may be an "OFDMA burst" comprising symbols contiguous in both time and frequency. FIG. 3E illustrates such an embodiment, wherein Frame 1 includes symbol groups (or portions) 310a, 310b, 310c, and 310d contiguous in time, and Frame 2 includes symbol groups (or portions) 311a, 311b, 311c, and 311d contiguous in time. For the embodiment shown in FIG. 3E, the techniques of the present disclosure can be used to derive separate interference level estimates for data portions 310a versus 310b, or for 310a versus 310c, or even for 310a versus 310b versus 310c versus 310d, if four interference estimators/dividers are used as disclosed hereinbelow.

Figure 4:
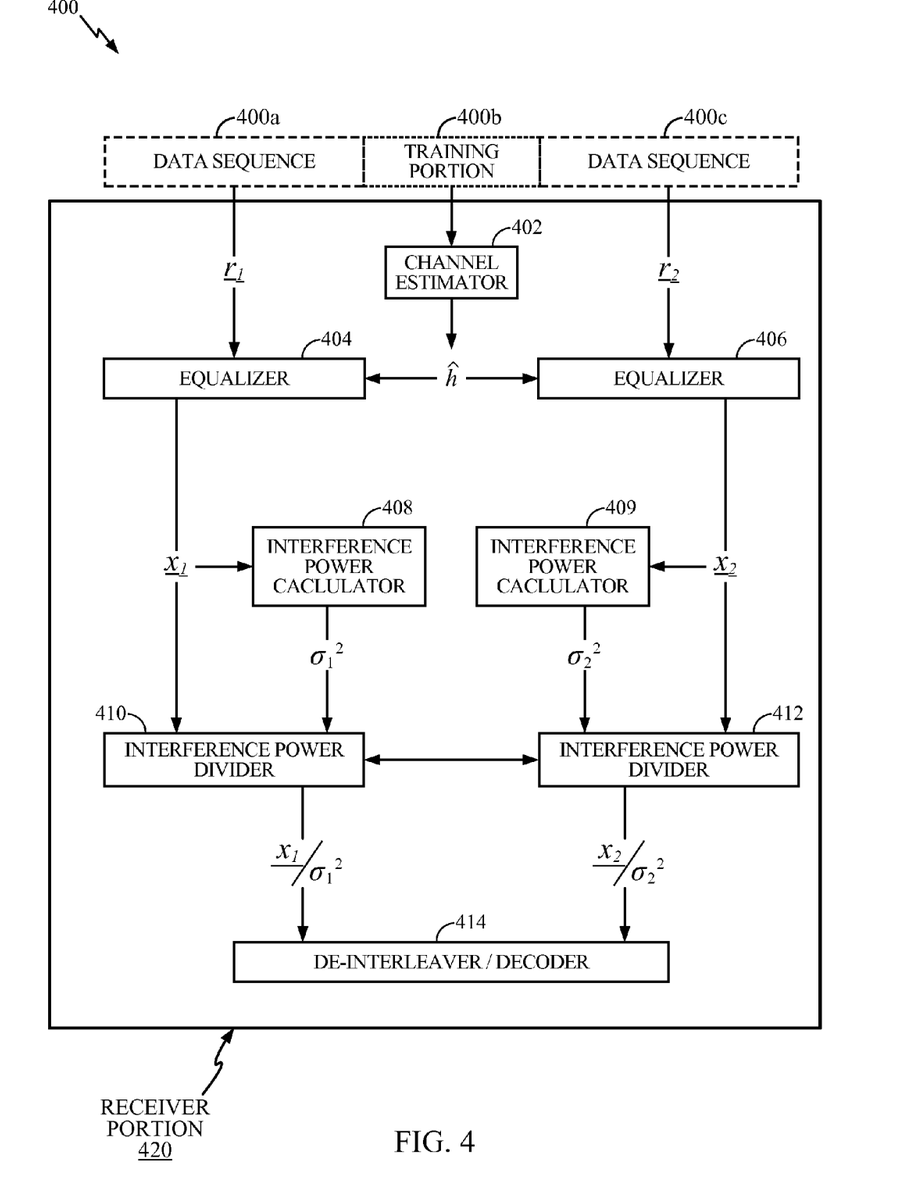
FIG. 4 shows an embodiment according to the present disclosure that provides for interference power estimates that vary for different portions of a desired signal.

FIG. 4 shows an embodiment according to the present disclosure that provides for interference power estimates that vary for different portions of a desired signal. The blocks in FIG. 4 are identical to the corresponding blocks in FIG. 2, except that there are two interference power calculators 408, 409. The interference power calculator 408 generates an interference power estimate $\sigma_1^2$ for the first data portion 400a, and interference power calculator 409 generates an interference power estimate $\sigma_2^2$ for the second data portion 400c. The equalized signals $x_1$ and $x_2$ are then divided by the corresponding interference power estimates to produce weighted outputs $x_1/\sigma_1^2$ and $x_2/\sigma_1^2$, respectively.

Note that while FIG. 4 depicts an embodiment wherein one interference power estimate is generated for each half of a total desired signal, the disclosure generally applies to any sub-level of interference estimation and/or scaling. For example, two interference power estimates may be generated for each half of a desired signal, bringing the total number of interference power estimates to four per desired signal. In this case, a greater number of interference power calculators and interference power dividers may be used than shown in FIG. 4. In general, increasing the number of sub-levels of interference estimation and/or scaling will better isolate the effects of a bursty interference source, but may decrease the accuracy of each interference estimate, as there are fewer samples contributing to each interference estimate.

An embodiment of the present disclosure to a receiver for a GSM system will be described herein.

Figure 5:
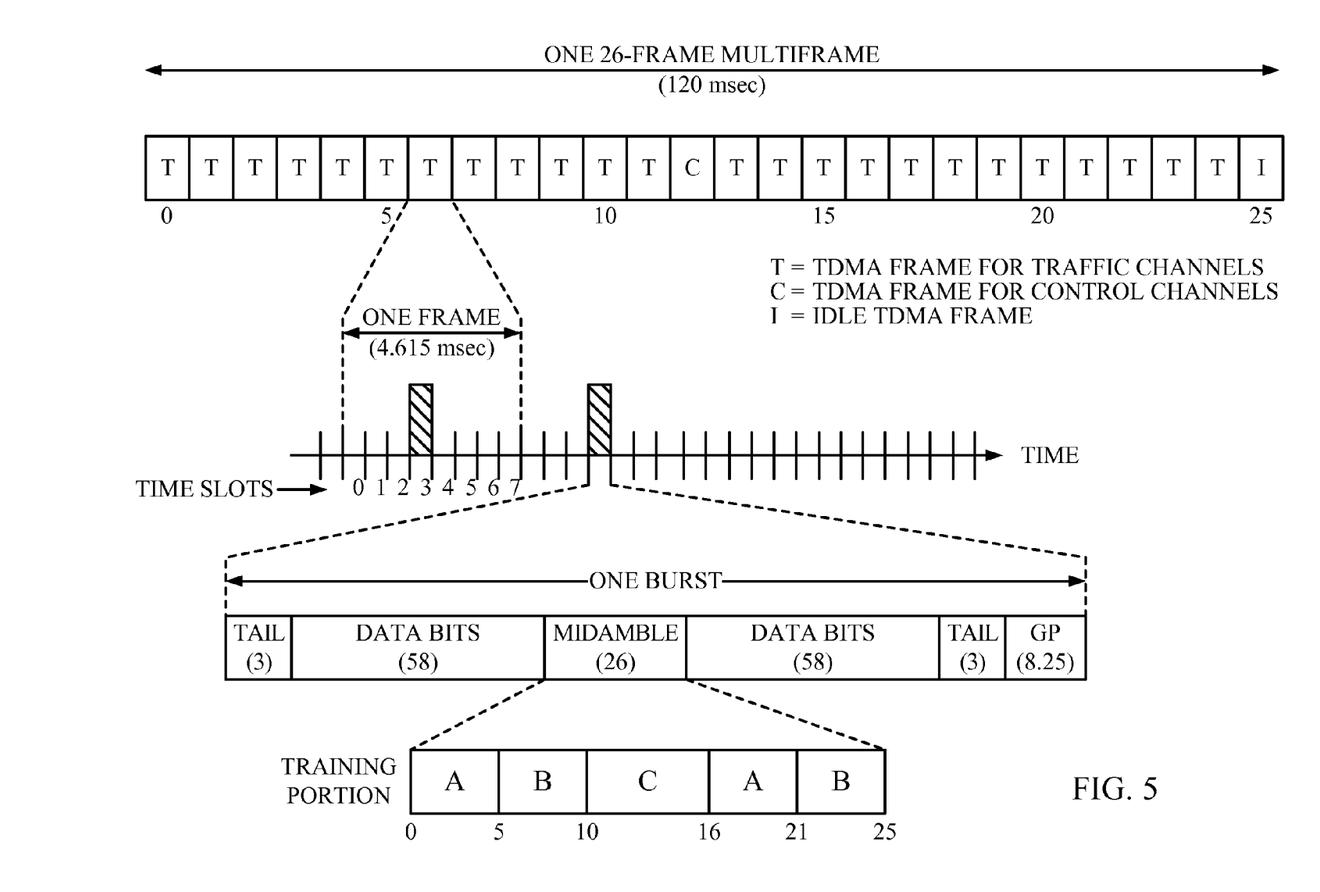
FIG. 5 shows GSM frame and GSM burst formats.

FIG. 5 shows GSM frame and GSM burst formats. The timeline for downlink transmission is divided into multiframes. For traffic channels used to send user-specific data, each multiframe includes 26 TDMA frames, which are labeled as TDMA frames 0 through 25. Note the use of the term "frame" in the context of GSM is to be distinguished from the term "frame" as used to describe a unit of desired signal. For clarity, the term "frame" as used in the context of GSM will be uniformly referred to as "TDMA frame" in the specification and the claims. Note also that in other non-GSM protocols or standards, the nomenclature may vary. The traffic channels are sent in TDMA frames 0 through 11 and TDMA frames 13 through 24 of each multiframe. A control channel is sent in TDMA frame 12. No data is sent in the idle TDMA frame 25, which may be used by the wireless devices to make measurements for neighbor base stations.

Each TDMA frame is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Note the term "burst" as used in the context of GSM is to be distinguished from the term "burst" as used to describe the possible nature of co-channel interference. For clarity, the term "burst" as used in the context of GSM will be uniformly referred to as "GSM burst" in the specification and the claims. Note also that in other non-GSM protocols or standards, the transmission in each time period may be termed differently. Possible denotations in such non-GSM protocols or standards include frame, slot, and packet.

Each GSM burst includes two tail fields, two data fields, a training sequence (or midamble) field, and a guard period (GP). The number of bits in each field is shown inside the parentheses. GSM defines eight different training sequences that may be sent in the training sequence field. Each training sequence contains 26 bits and is defined such that the first five bits (labeled as 'A') are repeated and the second five bits (labeled as 'B') are also repeated, as shown in FIG. 2.

Figure 6:
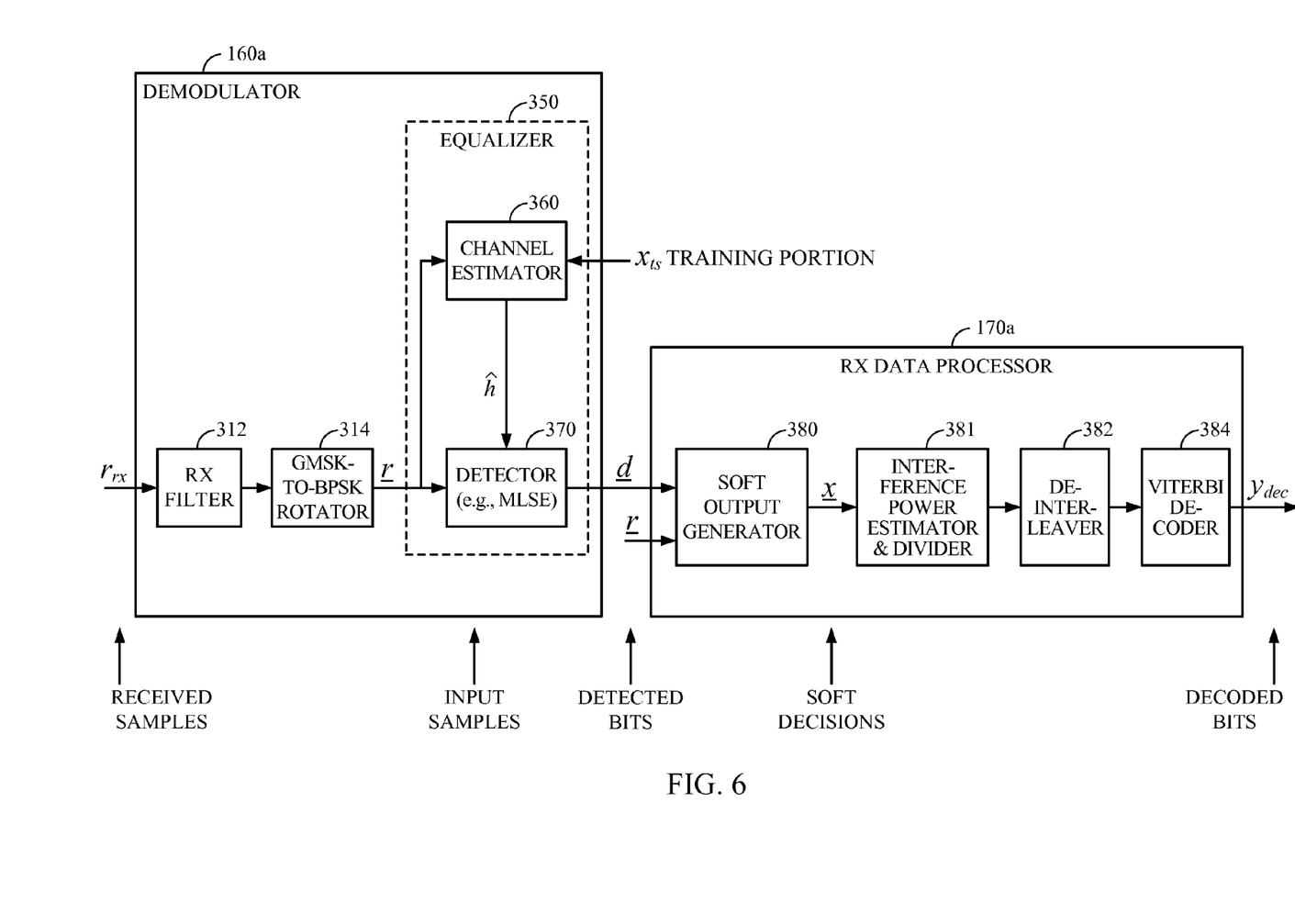
FIG. 6 shows a demodulator 160a and an RX data processor 170a for a GSM receiver.

FIG. 6 shows a demodulator 160a and an RX data processor 170a for a GSM receiver. Within demodulator 160a, an RX filter 312 filters the received samples $r_{rx}$ from receiver unit 154 in FIG. 1. A GMSK-to-BPSK rotator 314 performs phase rotation to provide input samples r.

An equalizer 350 performs equalization on the input samples r to remove intersymbol interference caused by multipath in the wireless channel. For the design shown in FIG. 6, equalizer 350 includes a channel estimator 360 and a detector 370. Channel estimator 360 receives the input samples r and the training sequence $x_{ts}$ and derives an estimate $\hat{h}$ of the channel response h.

Detector 370 receives the input samples r and the channel estimate $\hat{h}$ and performs detection to recover the bits input to the transmitter 110. Detector 370 may implement a maximum likelihood sequence estimator (MLSE) that determines a sequence of bits that is most likely to have been transmitted given the input sample sequence r and the channel estimate $\hat{h}$. The MSLE may use a Viterbi algorithm with $2^{L-1}$ states, where L is the length of the channel estimate $\hat{h}$. Detection with MLSE for GSM is well known in the art and not described herein. Detector 370 provides detected bits d, which are hard decision estimates of the bits sent from the transmitter 110.

Within RX data processor 170a, a soft output generator 380 receives the detected bits d and the input samples r and generates soft decisions that indicate the confidence in the detected bits. Soft output generator 380 may implement an Ono algorithm that is well known in the art. The interference power estimator and divider 381 may scale the soft decisions x from the soft output generator 380. A de-interleaver 382 then de-interleaves the scaled outputs in a manner complementary to the interleaving performed by transmitter 110. A Viterbi decoder 384 decodes the deinterleaved scaled soft decisions and provides decoded data $y_{dec}$, which is an estimate of the traffic data provided to TX data processor 120 at transmitter 110.

Figure 7:
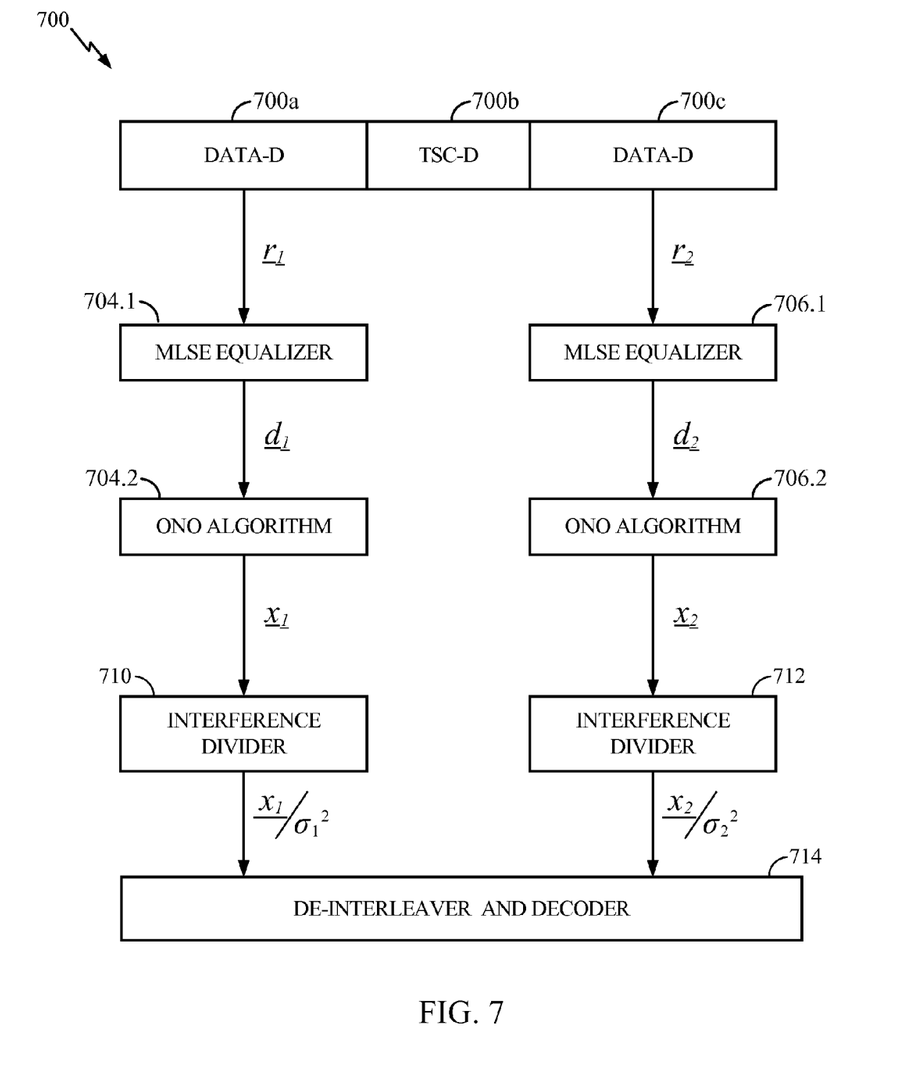
FIG. 7 shows an embodiment of the interference power scaling techniques of the present disclosure as applied to a specific GSM burst 700.

FIG. 7 shows an embodiment of the interference power scaling techniques of the present disclosure as applied to a specific GSM burst 700. The data portion 700a is referred to as a "left GSM semi-burst," while the data portion 700c is referred to as a "right GSM semi-burst." As the processing for data portion 700c is identical to that for data portion 700a, only the processing for 700a will be described herein. $r_1$ represents the signal provided to MLSE equalizer 704.1 for processing the data portion 700a of data signal 700. The output of MLSE equalizer $d_1$ is a vector of hard-decision bits, and is related to the input $r_1$ as follows:

$$\underline{d_1} = \max_{\hat{d}}[corr(\hat{d}, \underline{r_1} | \hat{h})];$$

where $\hat{d}$ represent all possible candidate vectors of zeros and ones, and the function corr (x, y) outputs the correlation metric between input vectors x and y given the channel estimate $\hat{h}$. As described earlier, the MLSE equalizer can be implemented as a classical Viterbi equalizer block.

Next, the soft metric vector $x_1$ associated with the vector $d_1$ may be derived. The vector $x_1$ contains reliability values indicating the confidence in the bits of the vector $d_1$. In the embodiment shown in FIG. 7, the soft metric vector $x_1$ is derived by the Ono algorithm block 704.2. The reliability metric for an nth bit of vector $d_1$ is contained in vector $x_1$ as $x_1[n]$, and, according to an embodiment, can be computed as:

$$x_1[n] = corr(d_1, r_1 | \hat{h}) - corr(d_1^{n'}, r_1 | \hat{h});$$

where $d_1^{n'}$ represents a modified vector with elements defined as follows:

$$d_1^{n'} = (\ldots d_1[n-2]; d_1[n-1]; inverse(d_1[n]); d_1[n+1]; d_1[n+2] \ldots ]).$$

Further details of the computation for the Ono algorithm can be found in, e.g., "A MLSE receiver for the GSM digital cellular system," Ono et al., in Proc. VTC '94, Stockholm, 1994, pp 230-233.

Once the soft decisions $x_1$ are derived, they can be scaled by dividing by the total interference power computed for that portion of the data, using divider 710. In an embodiment, interference power $\sigma_1^2$ can be computed as:

$$\sigma_1^2 = \frac{1}{N} \sum_n |x_1[n] - r_1[n]|^2;$$

wherein n is an index to each bit in the data portion 700a, and N is the total number of bits in the data portion 700a. After dividing by interference power, the scaled symbols are input to the de-interleaver and decoder block 714, which may process the symbols along with other symbols from the other data portions and/or GSM bursts.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

The invention claimed is:

1. A method for processing a frame in a communications system, the frame comprising a first data portion and a second data portion, the method comprising:
   receiving the first and second data portions in one of a data packet or a burst of the frame;
   estimating a first interference level including noise and co-channel interference associated with the first data portion and unassociated with the second data portion;
   estimating a second interference level including noise and co-channel interference associated with the second data portion and unassociated with the first data portion;

scaling a first signal derived from the first data portion with the first interference level; and scaling a second signal derived from the second data portion with the second interference level.

2. The method of claim 1, the system being a GSM system, the first and second data portions being in said burst of the frame, the burst being a GSM burst, the first data portion being a left GSM semi-burst, and the second data portion being a right GSM semi-burst.

3. The method of claim 1, the system being an IEEE 802.11g system, the first and second data portions being in said data packet of the frame, the data packet being a 802.11g data packet, the first data portion comprising a first set of contiguous sub-carriers, and the second data portion comprising a second set of contiguous sub-carriers.

4. The method of claim 2, the estimating the first interference level comprising estimating the interference received while receiving the first data portion, and the estimating the second interference level comprising estimating the interference received while receiving the second data portion.

5. The method of claim 2, the scaling the first signal comprising dividing the first signal by the first interference level, and the scaling the second signal comprising dividing the second signal by the second interference level.

6. The method of claim 2, the frame further comprising a training portion, the method further comprising:
receiving the training portion;
estimating a channel response using the training portion;
using the estimated channel response, equalizing a first received signal corresponding to the first data portion to derive the first signal; and
using the estimated channel response, equalizing a second received signal corresponding to the second data portion to derive the second signal.

7. The method of claim 6, wherein the training portion is disposed between the first and second data portions in time.

8. The method of claim 6, the estimating a first interference level associated with the first data portion comprising:
calculating a function of the difference between the first signal and the first received signal.

9. The method of claim 8, the function of the difference between the first signal and the first received signal being a sum of squares of the difference, the sum being further divided by an averaging factor.

10. The method of claim 2, further comprising:
deinterleaving the first and second scaled signals; and
decoding the first and second deinterleaved signals.

11. The method of claim 2, the frame further comprising a third data portion and a fourth data portion, the method further comprising:
receiving a third and fourth data portions;
estimating a third interference level associated with the third data portion;
estimating a fourth interference level associated with the fourth data portion;
scaling a third signal derived from the third data portion with the third interference level; and
scaling a fourth signal derived from the fourth data portion with the fourth interference level.

12. The method of claim 1, wherein the frame comprises symbols orthogonally transmitted in frequency.

13. The method of claim 1, wherein the frame comprises symbols orthogonally transmitted in space.

14. The method of claim 1, wherein the frame comprises symbols orthogonally transmitted in code.

15. The method of claim 1, the frame further comprising training symbols, the method further comprising:
receiving the training symbols;
estimating a channel response using the training symbols;
using the estimated channel response, equalizing a first received signal corresponding to the first data portion to derive the first signal; and
using the estimated channel response, equalizing a second received signal corresponding to the second data portion to derive the second signal.

16. The method of claim 15, wherein the training symbols are disposed between the first and second data portions in time.

17. The method of claim 15, the estimating a first interference level associated with the first data portion comprising:
calculating a function of the difference between the first signal and the first received signal.

18. An apparatus for processing a frame in a communications system, the frame comprising a first data portion and a second data portion, the apparatus comprising:
a receiver for receiving the first and second data portions in one of a data packet or a burst of the frame;
an interference estimator for estimating a first interference level including noise and co-channel interference associated with the first data portion and unassociated with the second data portion, and for estimating a second interference level including noise and co-channel interference associated with the second data portion and unassociated with the first data portion; and
a divider for dividing a first signal derived from the first data portion with the first interference level, and for dividing a second signal derived from the second data portion with the second interference level.

19. The apparatus of claim 18, the system being a GSM system, the first and second data portions being received in said burst of the frame, the burst being a GSM burst, and the symbols being contiguous in time.

20. The apparatus of claim 19, wherein the interference estimator is configured to estimate the first interference level by estimating the interference received while receiving the first data portion, and the second interference level by estimating the interference received while receiving the second data portion.

21. The apparatus of claim 20, the frame further comprising a training portion, the receiver being further configured to receive the training portion, the apparatus further comprising:
a channel estimator for estimating a channel response based on the received training portion; and
an equalizer for equalizing, using the estimated channel response, a first received signal corresponding to the first data portion to derive the first signal, the equalizer further configured to equalize, using the estimated channel response, a second received signal corresponding to the second data portion to derive the first signal.

22. The apparatus of claim 21, the interference estimator estimating the first interference level by calculating a function of the difference between the first signal and the first received signal.

23. The apparatus of claim 22, the function of the difference between the first signal and the first received signal being a sum of the squares of the difference, the sum being further divided by an averaging factor.

24. The apparatus of claim 19 further comprising:
a deinterleaver for deinterleaving the first and second scaled signals; and
a decoder for decoding the first and second deinterleaved signals.

25. The apparatus of claim 18, wherein the interference estimator is configured to estimate the first interference level by estimating the interference received while receiving the first data portion, and the second interference level by estimating the interference received while receiving the second data portion.

26. The apparatus of claim 18, the frame further comprising training symbols, the receiver being further configured to receive the training symbols, the apparatus further comprising:
 a channel estimator for estimating a channel response based on the received training symbols; and
 an equalizer for equalizing, using the estimated channel response, a first received signal corresponding to the first data portion to derive the first signal, the equalizer further configured to equalize, using the estimated channel response, a second received signal corresponding to the second data portion to derive the first signal.

27. The apparatus of claim 26, the interference estimator estimating the first interference level by calculating a function of the difference between the first signal and the first received signal.

28. The apparatus of claim 27, the function of the difference between the first signal and the first received signal being a sum of the squares of the difference, the sum being further divided by an averaging factor.

29. An apparatus for processing a frame in a communications system, the frame comprising a first data portion and a second data portion, the apparatus comprising:
 means for receiving the first and second data portions in one of a data packet or a burst of the frame;
 means for estimating a first interference level including noise and co-channel interference associated with the first data portion and unassociated with the second data portion;
 means for estimating a second interference level including noise and co-channel interference associated with the second data portion and unassociated with the first data portion;
 means for scaling a first signal derived from the first data portion with the first interference level; and
 means for scaling a second signal derived from the second data portion with the second interference level.

30. A computer program product processing a frame in a communications system, the frame comprising one of a data packet or a burst with a first data portion and a second data portion, the product comprising:
 a non-transitory computer-readable medium comprising:
 code for causing a computer to estimate a first interference level including noise and co-channel interference associated with the first data portion and unassociated with the second data portion;
 code for causing a computer to estimate a second interference level including noise and co-channel interference associated with the second data portion and unassociated with the first data portion;
 code for scaling a first signal derived from the first data portion with the first interference level; and
 code for scaling a second signal derived from the second data portion with the second interference level.

31. The computer program product of claim 30, wherein a training portion is between the first and second data portions, the non-transitory computer-readable medium further comprising:
 code for causing a computer to estimate a channel response using the training portion;
 code for causing a computer to equalize a first received signal corresponding to the first data portion to derive the first signal; and
 code for causing a computer to equalize a second received signal corresponding to the second data portion to derive the second signal.

* * * * *